3,781,287
PROCESS FOR THE REGENERATION OF DEACTIVATED CARBON CATALYST
Yelagondahally S. Suryanarayana and Luther J. Reid, Jr., Mobile, Ala., assignors to Ciba-Geigy Corporation, Ardsley, N.Y.
No Drawing. Filed May 11, 1971, Ser. No. 142,392
Int. Cl. C07d 55/42
U.S. Cl. 260—248 C     2 Claims

ABSTRACT OF THE DISCLOSURE

A process for regenerating deactivated (spent) carbon catalyst by subjecting the catalyst to a treatment with chlorine gas at a temperature of at least 375° C. for a time period of at least five minutes, and preferably several hours. Desirably, the amount of chlorine gas used is at least about 0.1 lb. to about 1 lb. for each lb. of the spent carbon catalyst being treated.

STATEMENT OF INVENTION

The present invention relates to a novel process and more particularly, the present invention relates to a process for regenerating spent (deactivated) carbon catalyst by treating the deactivated carbon catalyst with chlorine gas at a temperature of at least about 375° C. and, more suitably, from about 425° C. to about 500° C. for a period of at least about 5 to 15 minutes. The amount of chlorine gas used ranges from at least about 0.1 lb. and suitably about 0.2 lb. to about one pound for each pound of catalyst being regenerated.

BACKGROUND OF THE INVENTION

Cyanuric chloride is a very important chemical compound because it is used as intermediate for the manufacture of many important products, for example, chemotherapeutic agents, herbicides, plastics, fluorescent whitening agents, rubber and other important industrial products. One of the methods which has been used for the production of cyanuric chloride is the catalytic conversion of cyanogen chloride. In this method, cyanogen chloride is trimerized in the vapor phase using carbon as the catalyst. See for example, U.S. Pat. 3,312,697 and U.S. Pat. 3,018,288.

Using these methods, after a number of hours of operation, the carbon catalyst becomes deactivated or "spent." "Deactivated" and "spent" are terms of art indicating that the catalyst cannot function adequately, i.e., it cannot convert more than about 20% CNCl to the desired trimerized product.

DESCRIPTION OF THE INVENTION

In the broader aspects of this invention, the present process is concerned with a novel method whereby the deactivated or spent carbon catalyst from the trimerization reaction can be reactivated and used over and over again in subsequent reactions without the use of new carbon catalyst. The conditions of the trimerization reaction are well known in the art and these conditions do form a portion of this invention. The practice of this invention is illustrated by the following detailed description.

In accordance with the technique of this disclosure, "spent" or deactivated carbon catalyst is regenerated or its activity is restored by treating the spent or deactivated carbon catalyst with chlorine gas at a temperature in excess of about 375° C. and suitably, at a temperature of from about 425° to 500° C. The uppermost temperatures employed in the process will be governed as a practical matter only by the materials used in the construction of the treatment chamber. Therefore, in most instances the uppermost temperature will generally be about 1000° C.

The time of treatment will aid in determining the amount of regeneration of the deactivated catalyst. While noticeable improvements will be obtained in a relatively short time period, such as five or thirty minutes, the present invention for optimum results will employ a treatment time at least one or two hours and, more preferably, five to eight hours.

The amount of chlorine generally employed ranges from at least about 0.1 lb. to about 1 lb. to each pound of the deactivated carbon catalyst being regenerated and suitably, about 0.2 lb. While improvement in catalyst activity is possible with lower amounts of chlorine, the efficiency of activation will be considerably decreased based on overall improvement considering the time temperature treatment conditions. There is no upper limit on the amount of chlorine or chlorine containing gas that may be employed, although essentially no increase in catalyst activity will result from excessive use of chlorine.

Thus in a typical operation, the selected weight of chlorine gas based on weight of the catalyst being treated, is passed through the catalyst bed containing the deactivated carbon catalyst within the temperature range described, such as 500° C. for a time interval of five to eight hours. Generally speaking, when chlorine is employed at high temperatures, the catalyst tends to be regenerated at a faster rate than at temperatures approaching 375–400° C. In addition, at higher temperatures generally less chlorine gas per pound of catalyst is required to obtain the same results.

It appears that at the elevated temperatures, the chlorine gas or chlorinating agent reacts with the "foulants" and converts them to volatile materials which are purged out of the system.

Although the reason why a chlorine containing gas regenerates the spent catalyst is not known with certainty, and present process is not considered to be a purging operation. For example, the use of nitrogen gas employed under the conditions of the present process produces essentially no change in the spent catalyst activity. Therefore, it is believed that chlorine must in some way react with materials in the spent charcoal catalyst to cause the regeneration.

The above theory is supported by the fact that the regenerated catalyst after treatment in accordance with the present process can have the same efficiency in catalyzing the trimerization of cyanogen chloride as a fresh catalyst. Additionally, in several instances, the present regeneration technique has yielded a catalyst whose efficiency as a trimerization catalyst is slightly higher than the initial fresh catalyst.

The technique of the present disclosure allows repeated regeneration of spent catalyst. The charcoal catalyst is employed in the trimerization of cyanogen chloride until its catalytic activity becomes unduly decreased. The level of catalyst activity at which regeneration is desired to take place is a matter of choice and is determined in part by the additional costs involved in employing a catalyst with low activity in catalyzing the trimerization of the cyanogen chloride.

The catalyst is regenerated with the chlorine containing gas in accordance with the disclosed technique and reused. This catalytic usage followed by regeneration of the same catalyst may take place repeatedly.

While carrier gases may be employed with the chlorinating gas of this disclosure, these gases are generally considered as surplus materials since they merely serve in their expected carrier function.

By the practice of this invention, the regenerated carbon catalyst possesses the activity and durability comparable to that of the fresh catalyst and therefore can be used over and over again in the important process for the production of cyanuric chloride. Thus, not only is the present process important economically but, in addition, the regenerated catalyst can be maintained in the bed without stripping the apparatus or equipment used in the production of cyanuric chloride.

It is obvious to one skilled in the art that although chlorine has been used to illustrate the practice of this invention, other chlorinating agents, for example, phosgene, and the like, can also be advantageously employed.

The present invention is further illustrated by the following examples which are not to be considered as limiting.

EXAMPLE I

A commercial carbon catalyst, CXAC, after extensive use in the trimerization of cyanogen chloride was initially employed. The activity of the spent catalyst was 1.6 (F/W hr.$^{-1}$), that is a pound of the catalyst was able to convert about 1.6 lbs. of cyanogen chloride to cyanuric chloride, at a temperature of 370° C., at 70% efficiency. The 70% efficiency factor is utilized since it allows accurate comparison as opposed to other efficiency levels. The spent catalyst was subjected to chlorine gas at a weight of 1 lb. of chlorine to 1 lb. of catalyst at a temperature of 500° C. for 24 hours. The trimerization was repeated using feed gas which was dry and was composed of 96 mol percent CNCl and 4 mol percent of chlorine. After 48 hours, the activity of the regenerated catalyst was 4.6 at the 70% efficiency which was comparable to that of the fresh carbon catalyst.

EXAMPLE II

The same procedure was followed as in Example I except for the fact that the deactivated catalyst was subjected to a temperature of 425° C. for a period of 24 hours. The activity of the regenerated catalyst was 4.7 with 1 lb. of the regenerated catalyst able to convert about 70% of 4.7 lbs./hr. of CNCl.

EXAMPLE III

The same procedure was followed as in Example I except for the fact that the spent carbon catalyst was subjected to treatment with chlorine gas for a period of 10 hours at 500° C. at a rate of 0.25 lb. chlorine gas per lb. of catalyst. The activity of the regenerated catalyst was found to be 5.0.

EXAMPLE IV

The same procedure was followed as in Example I except for the fact that the spent catalyst was subjected to treatment with chlorine gas at a rate of 0.12 per lb. of catalyst at a temperature of 500° C. for 5 hours. The feed gas was in a dry state and the activity was found to be 5.3. When the feed gas was fed in a wet condition, the activity was found to be 5.0.

EXAMPLE V

The procedure used in Example I was followed except for the fact that the deactivated carbon catalyst was subjected to treatment with chlorine gas at a temperature of about 600° C. for a period of 1 minute. The activity of the resulting regenerated catalyst was found to be 4.7.

EXAMPLE VI

The same procedure was followed as in Example I except for the fact that the spent or deactivated carbon catalyst was subjected to treatment with chlorine gas at a temperature of 400° C. for a period of 30 hours. After this period of time, the activity was found to be 5.0.

What is claimed is:

1. In a process for the preparation of cyanuric chloride by trimerization of a cyanogen chloride in the vapor phase over activated carbon catalyst, the improvement which comprises treating the carbon catalyst after it has become deactivated in the course of said trimerization with about 0.1 lb. to about 1 lb. of chlorine for each pound of deactivated catalyst at a temperature of about 375° C. to about 1000° C. and for a time of about five minutes to about 24 hours, thereby regenerating the catalytic efficiency of said deactivated carbon catalyst for reuse in said trimerization.

2. The process of claim 1 wherein said regeneration treatment takes place at a temperature of about 425° C. to about 500° C. for a time of about 2 to about 8 hours.

References Cited
UNITED STATES PATENTS

| | | | |
|---|---|---|---|
| 2,491,459 | 12/1949 | Thurston | 260—248 |
| 3,524,852 | 8/1970 | Gruber et al. | 260—248 |

JOHN M. FORD, Primary Examiner

U.S. Cl. X.R.

252—445